(12) United States Patent
Deixler et al.

(10) Patent No.: US 12,618,936 B2
(45) Date of Patent: May 5, 2026

(54) SYSTEM FOR CONTROLLING A RADIOFREQUENCY SENSING

(71) Applicant: SIGNIFY HOLDING B.V., Eindhoven (NL)

(72) Inventors: Peter Deixler, Arlington, MA (US); Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 361 days.

(21) Appl. No.: 18/272,151

(22) PCT Filed: Jan. 6, 2022

(86) PCT No.: PCT/EP2022/050207
§ 371 (c)(1),
(2) Date: Jul. 13, 2023

(87) PCT Pub. No.: WO2022/152614
PCT Pub. Date: Jul. 21, 2022

(65) Prior Publication Data
US 2024/0069145 A1     Feb. 29, 2024

Related U.S. Application Data

(60) Provisional application No. 63/137,335, filed on Jan. 14, 2021.

(30) Foreign Application Priority Data

Feb. 22, 2021     (EP) ..................................... 21158417

(51) Int. Cl.
*G01S 5/02*     (2010.01)
*G01S 7/00*     (2006.01)
(Continued)

(52) U.S. Cl.
CPC .......... *G01S 5/02521* (2020.05); *G01S 7/003* (2013.01); *G01S 13/865* (2013.01); *G01S 13/878* (2013.01)

(58) Field of Classification Search
CPC .... G01S 5/02521; G01S 7/003; G01S 13/865; G01S 13/878
(Continued)

(56) References Cited

U.S. PATENT DOCUMENTS

2012/0146788 A1* 6/2012 Wilson ................. G08B 13/187
                                                       340/539.23
2014/0044212 A1   2/2014 Menzel et al.
(Continued)

FOREIGN PATENT DOCUMENTS

WO        2021023725 A1      2/2021

*Primary Examiner* — Bo Fan

(57) ABSTRACT

The invention refers to a system for controlling a radiofrequency sensing of a network 100. The network is adapted to perform different radiofrequency sensing modes, e.g. RSSI-, CSSI- or Doppler based modes. The system 130 comprises a providing unit 131 for providing environmental information, wherein the environmental information is indicative of a physical property of one or more surfaces in an environment of the network. A selecting unit 132 is adapted for selecting and/or modifying a radiofrequency sensing mode to be performed by the network, wherein the radiofrequency sensing mode is selected and/or modified based on the environmental information, and a controlling unit 133 is adapted for controlling the network 100 to perform the selected and/or modified sensing mode Taking the physical properties of surfaces in an environment into account and modifying and/or selecting the utilized radiofrequency sensing mode accordingly increases the reliability and the accuracy of the radiofrequency sensing.

14 Claims, 3 Drawing Sheets

(51) Int. Cl.
  G01S 13/86          (2006.01)
  G01S 13/87          (2006.01)
(58) Field of Classification Search
  USPC ....................................... 340/539.23; 342/27
  See application file for complete search history.

(56)                    References Cited

U.S. PATENT DOCUMENTS

2018/0102858  A1      4/2018  Tiwari et al.
2020/0209372  A1      7/2020  Seth et al.

* cited by examiner

SYSTEM FOR CONTROLLING A RADIOFREQUENCY SENSING

CROSS-REFERENCE TO PRIOR APPLICATIONS

This application is the U.S. National Phase application under 35 U.S.C. § 371 of International Application No. PCT/EP2022/050207, filed on Jan. 6, 2022, which claims the benefit of U.S. Provisional Patent Application No. 63/137,335, filed on Jan. 14, 2021 and European Patent Application No. 21158417.2, filed on Feb. 22, 2021. These applications are hereby incorporated by reference herein.

FIELD OF THE INVENTION

The invention relates to a system, a method and a computer program product for controlling a radiofrequency sensing of a network. Further, the invention relates to a network comprising a system for controlling a radiofrequency sensing of the network.

BACKGROUND OF THE INVENTION

Currently, radiofrequency sensing is often performed using two different measures that are indicative of a wireless radiofrequency communication link. One of these common methods refers to using the received signal strength indicator (RSSI) for measuring an overall attenuation of a wireless radiofrequency signal between two network devices. Another commonly used method refers to using the channel state information (CSI) representing the signal propagation of the wireless radiofrequency signal between two network devices along multiple spatial paths. Generally, the CSI provides very detailed information on the environment with which the radiofrequency signal has interacted and thus allows for a very accurate sensing, for instance, of very small movements like breathing movements. However, it has been noticed that although theoretically a CSI-based measuring is very accurate, in many applications the accuracy is very low due to unexpected interactions of the radiofrequency signal with the environment. RSSI-based sensing methods on the other hand do not provide the same sensing performance as CSI-based sensing methods, since the RSSI measurement provides less detailed information on the radiofrequency signal. However, RSSI-based measurement methods are less influenced by environmental conditions and thus provide a very reliable sensing performance.

It would thus be advantageous to provide a radiofrequency system that allows for a reliable and/or accurate sensing, if necessary.

WO 2021023725A1 discloses a method for selecting a communication technology in a radio frequency (RF)-based sensing system with one or more nodes. The RF-based sensing system is configured for performing RF-based sensing using one or more of two or more different communication technologies. A communication technology for performing RF-based sensing in the RF-based sensing system is selected for one or more of the nodes based on one or more parameters related to RF-based sensing in the RF-based sensing system. The parameters can include sensing application parameters, sensing quality parameters, system resource parameters, and contextual parameters.

SUMMARY OF THE INVENTION

It is an object of the present invention to provide a system, a network, a method and a computer program product that allow for a reliable and accurate radiofrequency sensing.

In a first aspect of the present invention, a system for controlling a radiofrequency sensing of a network comprising a plurality of network devices is presented, wherein the network is adapted to perform different radiofrequency sensing modes, wherein the system comprises a) an environmental information providing unit for providing environmental information, wherein the environmental information is indicative of a physical property of one or more surfaces in an environment of the network, b) a selecting unit for selecting and/or modifying at least one of the radiofrequency sensing modes to be performed as radiofrequency sensing by at least a part of the network, wherein the at least one radiofrequency sensing mode is selected and/or modified based on the environmental information, and c) a controlling unit for controlling the at least a part of the network to perform the at least one selected and/or modified radiofrequency sensing mode.

Since the selecting unit is adapted to select and/or modify at least one radiofrequency sensing mode based on environmental information indicative of a physical property of one or more surfaces in an environment of the network, the radiofrequency sensing can be performed based on the radiofrequency sensing mode, for instance, an RSSI or CSI sensing mode, that provides the best results in the environment of the radiofrequency sensing network. In particular, taking the physical properties of surfaces in an environment of the network into account and modifying and/or selecting the utilized radiofrequency sensing mode accordingly increases the reliability and the accuracy of the radiofrequency sensing.

The system is adapted for controlling a radiofrequency sensing of a network comprising a plurality of network devices. Generally, a radiofrequency sensing network comprises at least two network devices, more preferably at least three network devices. In an embodiment, the network can be or can be part of a lighting system, in which case at least some of the network devices can be lights whose light output is controlled based on sensing results of the radiofrequency sensing. Moreover, the network may be or may be part of a smart home system, in which case the network devices can be smart home devices executing a function in a home or office of the user, for instance, based on the sensing results. The network is formed by the network devices of the network, in particular, by the communication between the network devices of the network. The communication and thus the network can be based on any known network communication protocol, like WiFi, ZigBee, Bluetooth, etc.

The network devices preferably each comprise a communication unit adapted to receive and transmit wireless signals, particularly radiofrequency signals, and/or wired signals for communication. The communication unit of a network device, which can also be referred to as a network device communication unit, may comprise a receiving unit and a transmitting unit, wherein the receiving unit and the transmitting unit can also be integrated with each other in the form of a transceiver, for instance. Radiofrequency signals can generally be understood as wireless signals constituted by electromagnetic radiation in the radiofrequency range. The network can comprise the system and possible further systems. However, the network can also be regarded as not comprising the system. Generally, the system can be realized as hardware and/or software on any dedicated or general computing device. In particular, the hardware and/or software representing the system can be provided as part of one or more of the network devices, wherein the system is then formed by the communication between the one or more network devices. However, the hardware and/or software representing the system can also be provided in form of a computing device not being part of the network, wherein in this case the computing device preferably comprises a communication unit that is adapted to receive and transmit wireless signals and/or wired signals for communication, in particular, for communication with the network devices of the network. Further, the system can also be located on an external computing device, for instance, a cloud, in particular, on one or more servers, that is adapted to communicate with the network, in particular, with at least one of the network devices.

The network is adapted to perform different radiofrequency sensing modes. In particular, at least a part of the network devices is adapted to send and receive the radiofrequency signals of the different radiofrequency sensing modes and at least one of the network devices of the network is adapted to perform radiofrequency sensing based on the sent and received radiofrequency signals with respect to the radiofrequency sensing mode. In particular, the network and thus the network devices can be adapted to or in communication with a device that is adapted to process received radiofrequency signals in accordance with the respective radiofrequency sensing mode, for instance, by applying a respective analysis algorithm.

In a preferred embodiment, the network is adapted to perform as radiofrequency sensing mode at least one of a CSI-based sensing mode, an RSSI-based sensing mode and a Doppler-based sensing mode. In a CSI-based sensing mode the radiofrequency sensing is performed based on a measurement of the CSI of a radiofrequency signal between a transmitter and a receiver of the radiofrequency signal, i.e. between two network devices. In an RSSI-based sensing mode the radiofrequency sensing is performed based on an RSSI measurement of the radiofrequency signal between a transceiver and a transmitter, i.e. between two network devices. In the Doppler sensing mode a Doppler analysis is performed based on a radiofrequency signal received by at least one of the network devices to determine, for instance, a movement of a person in a region in which the radiofrequency sensing is performed.

The environmental information providing unit is adapted to provide environmental information. For example, the environmental information providing unit can be a receiving unit being adapted to receive environmental information, for example, from a user input or another device for providing the same. However, the environmental information providing unit can also be a storage unit on which the environmental information is already stored. The environmental information is indicative of a physical property of one or more surfaces in an environment of the network. The one or more surfaces in the environment of a network refer to any kind of surface of an object. Moreover, the term "surface" is defined in the context of this invention to refer to any part of an object that can interact with a radiofrequency signal provided by one of the network devices. In most cases, this definition indeed refers to the general surface of an object, i.e. to a boundary surface or interface between an object and its environment. However, in particular, for objects that are at least partially transparent to radiofrequency signals, the surface can also lie within the object or can refer to one or more surface layers that act differently with the radiofrequency signals. For example, radiofrequency signals can penetrate with only a low interaction an outer textile surface of a bench and then predominantly interact with surfaces of metal springs in the bench. In another example, some modern windows comprise a heat reflecting metal film within one of the layers of the window, wherein also radiofrequency signals can interact with this reflecting metal film but not with the glass layers around the metal film. The physical properties of which the environmental information is then indicative can be any properties of the one or more surfaces in the environment of the network. For example, the physical properties can be indicative of or refer to the material and/or texture of a surface. However, the physical properties can also be indicative of or refer to a position, size and/or orientation of the surface in relation to at least a part of the network, for instance, to at least one network device. Moreover, in particular, if a surface within the object interacts with the radiofrequency signals, the physical properties of the surface of the object can also refer to the physical properties of one or more layers above the interacting surface that also interact with the radiofrequency signal, preferably, to an attenuation coefficient and/or a thickness of the one or more layers that influences the amount of radiofrequency signals reaching the surface within the object. From such information also, for instance, the amount of surfaces in an environment can be derived and also be provided as environmental information. Preferably, the provided physical properties allow to determine an expected interaction between a radiofrequency signal and the surface. However, if not all physical properties for determining an expected interaction are provided, missing information can be substituted with predetermined general values. For example, if only a position and orientation is provided but no material information, the material information can be substituted by a predetermined material, for instance, concrete. Preferably, the provided environmental information is unrelated to a sensing target of the radiofrequency sensing. For example, if it is a goal of the radiofrequency sensing to determine the presence or absence of a human being, it is preferred that the environmental information is unrelated to a human being present in the sensing area, i.e. does not refer to physical properties of a human being. However, in other applications the provided environmental information can also relate to a sensing target. For example, the environmental information can relate to an expected attenuation of the sensing target, wherein, if the sensing target is a small mammal, like a cat or a dog, the attenuation is expected to be low and the selection unit can be adapted to select a Doppler sensing mode for sensing the movements of the sensing target. Moreover, the physical properties can also be indicative of or refer to a status of the surface. For example, the environmental information can be indicative of whether a surface is wet, i.e. comprises a thin water layer, since also such status information can have an impact on the interaction of the surface with the radiofrequency signals.

The selecting unit is adapted to select and/or modify at least one of the radiofrequency sensing modes to be performed as radiofrequency sensing by at least a part of the network. For example, the selecting unit can be adapted to select whether the network shall perform a CSI-based sensing mode, an RSSI-based sensing mode and/or a Doppler-based sensing mode. Preferably, the selecting unit selects only one of the radiofrequency sensing modes. However, the selecting unit can also be adapted to select, for specific cases, more than one radiofrequency sensing mode to be performed. For example, two of the radiofrequency sensing modes can be performed in parallel. The selecting unit can be adapted to decide to select more than one radiofrequency sensing mode, preferably, based on information on the performance capabilities of the network or one or more network devices. For example, different radiofrequency sensing modes can require different performance capabilities, like computational or storage capabilities, and the selecting unit can be adapted to select more than one radiofrequency sensing mode if the performance capabilities allow the performing of the selected radiofrequency sensing modes at the same time. Moreover, the selecting unit can be adapted to modify a presently performed sensing mode or a selected sensing mode, for instance, by customizing the respective sensing mode. The modification can refer, for instance, to an adaption of the sensing mode to a present application or situation in which the radiofrequency sensing shall be performed. For example, a modification can refer to adapting weights or thresholds provided as part of the sensing mode or can refer to selecting from the plurality of network devices the network devices that shall perform the radiofrequency sensing mode.

The selecting unit is adapted to select and/or modify the radiofrequency sensing modes based on the environmental information. For example, if information is provided that a surface is present with a physical property that is known to cause disturbances in a CSI-based sensing mode, the selecting unit can be adapted to select instead of a CSI-based sensing mode that the radiofrequency sensing is performed based on an RSSI-based sensing mode which is less impacted by interactions of the radiofrequency signal with surfaces in the environment. The selecting unit can be adapted to use predetermined rules indicating based on which physical properties of surfaces which radiofrequency sensing mode shall be selected and/or modified. The rules can be predetermined by a user, for instance, based on experience, or based on a calibration, for instance, during a setup of the network. Moreover, the selecting unit can be adapted to learn the rules by itself, for instance, the selecting unit can be adapted to always select a first mode, wherein a user is then allowed to change this first mode if the results of this first sensing mode seem to be not suitable for the user, wherein the selecting unit can then be adapted to learn in which situations the user selects a different sensing mode from the first sensing mode. Generally, the rules can refer to very simple rules, for instance, indicating that if a specific material or a certain amount of surfaces is present in the environment of the network, always a respective corresponding sensing mode is to be performed. However, the rules can also be more complex comprising a plurality of conditions and taking into account more than one physical property or the physical properties of more than one surface for selecting and/or modifying the radiofrequency sensing modes.

The controlling unit is adapted to control at least a part of the network to perform the at least one selected and/or modified radiofrequency sensing mode. For example, the controlling unit can be adapted to control network devices belonging to the at least a part of the network to send and receive the radiofrequency signals as suitable for the selected and/or modified radiofrequency sensing mode. Moreover, the controlling unit can be adapted such that the network or at least a part of the network applies respective radiofrequency sensing algorithms corresponding to a selected and/or modified radiofrequency sensing mode to the received radiofrequency signals of the at least a part of the network.

In an embodiment, the physical properties are indicative of an interaction of the surface with a radiofrequency signal utilized for the radiofrequency sensing. Preferably, the physical properties are indicative of a material and/or texture and a location, physical size and/or orientation of the one or more surfaces in relation to at least a part of the plurality of network devices. Providing, in addition to information indicative of materials and/or textures of surfaces in the environment of the network, also information that is indicative of a location, physical size and/or orientation of the one or more surfaces in relation to at least a part of the network, i.e. to at least one network device, allows to determine the influence of the surfaces on the radiofrequency sensing more accurately and thus also allows for a more accurate selection and/or modification of a respective radiofrequency sensing mode. Providing information on a location of a surface in relation to the at least a part of the network allows, for instance, to determine whether a reflection or scattering on the surface may be experienced by a radiofrequency signal on its path between two of the network devices. Moreover, a physical size of the surface allows to determine whether the radiofrequency signal, depending on its wavelength, interacts with the surface at all or which type of interaction is to be expected, for instance, scattering or reflection of the radiofrequency signal. Moreover, an orientation of the one or more surfaces influences, for instance, in which directions a radiofrequency signal is reflected by the surface. Thus, the selecting unit can be adapted to apply rules that also take all provided information on the surfaces into account for selecting and/or modifying a radiofrequency sensing mode. For example, the rules applied by the selecting unit can also comprise conditions with respect to the position, size, and/or orientation. For example, a rule can comprise a condition stating that a selection of a sensing mode requires that no reflecting surface is present in a certain orientation and distance to one or more of the network devices.

The environmental information being indicative of, for instance, locations, physical size and/or orientation and further information with respect to physical properties can be acquired by using a LiDAR scan of the environment. However, the environmental information can also be acquired from images of the environment. For example, the environmental information providing unit can be adapted to prompt a user to make overlapping images from different perspectives within a room and can then be adapted to infer materials, textures, locations, sizes and/or orientations of surfaces within the room from these images. Moreover, if available, also blueprints, building plans or structural designs can be used to infer the environmental information for a room.

In a preferred embodiment, the selecting and/or modifying comprises simulating propagation paths of radiofrequency signals between the network devices of at least the part of the network based on the environmental information. The simulation of propagation paths of radiofrequency signals can be based on known physical laws for the propagation of electromagnetic waves and of interactions with different materials and surfaces. The environmental information can then be provided as input to the simulation, and the respective propagation paths can be provided as output of the simulation. The selecting unit can then be adapted to select and/or modify the radiofrequency sensing modes based on the simulated propagation paths. For example, if the simulated propagation paths show that a certain amount of the radiofrequency signals can interact with objects outside of a room in which the sensing shall be performed and thus can be influenced by these objects, the selecting unit can be adapted to select as radiofrequency sensing mode a CSI-based sensing mode and to modify the CSI-based sensing mode such that channels, i.e. propagation paths, that might have interacted with an object outside the room, are weighted less strongly during the radiofrequency sensing inside the room.

In an embodiment, the selecting and/or modifying is further based on regions of interest information indicative of the location of subjects of interest in the environment. The region of interest information may be indicative of the location or regions of subjects of interest (e.g., a person) and/or objects in the environment in which the radiofrequency sensing is of interest. For example, the region of interest information can be indicative of the location, for instance, region, in which it is expected that persons perform certain activities that shall be monitored by the radiofrequency sensing. The selecting unit can thus use this information, for instance, to determine the respective radiofrequency signal propagation in this region of interest and then to select and/or modify a radiofrequency sensing mode accordingly. In particular, it can be the case that with respect to the whole environment of the network, for instance, of a whole room in which the network is installed, a first radiofrequency sensing mode is most suitable for the radiofrequency sensing, whereas the radiofrequency selection unit can determine that with respect to a specific region of interest within the room a different second radiofrequency sensing mode might be more suitable. Thus, the selecting and/or modifying of the radiofrequency sensing mode can specifically be adapted to a specific intended application of the radiofrequency sensing. Moreover, in an alternative or additional embodiment, the selecting and/or modifying can be further based on regions of non-interest information indicative of the location or regions and/or objects in the environment in which the radiofrequency sensing is not of interest. For example, if the radiofrequency sensing shall be applied to a presence detection of persons in a garden, a region of non-interest may refer to a location at which a decorative pond is provided in the garden, since it is to be expected that no person is present in the decorative pond. The selecting unit can then be adapted to select and/or modify the radiofrequency sensing modes while ignoring the performance of a radiofrequency sensing mode in the region of non-interest during this process, for instance, by ignoring the influence of surfaces on propagation paths in the region of non-interest or by ignoring influences of certain surfaces on the detection of persons in the region of non-interest. This allows to more accurately select and/or modify a radiofrequency sensing mode with respect to the regions that are more interesting for a user.

In an embodiment, the radiofrequency sensing is applied as vital sign detection, gait detection and/or gesture detection of one or more persons, and the region of interest information refers to a region in which the one or more persons are present in a predetermined time period. In a preferred example, the radiofrequency sensing is applied to a vital sign detection of one or more sleeping persons, for instance, of breathing detection of a child or elderly person. In this preferred example, the region of interest information refers to a region of a bedroom in which the bed of the person is present such that the selecting unit can select and/or modify the radiofrequency sensing mode such that an accurate and reliable breathing detection in this region of interest is achieved. In particular, the selecting unit can in this case be adapted to select for a very accurate vital sign detection a CSI-based sensing mode and can then be adapted to modify the CSI-based sensing mode such that signal paths coming from or going into the region of interest are provided with a higher weight than other signal paths, for instance, a signal path of the radiofrequency signal being reflected on an opposite wall. In a further aspect of this preferred example, the vital signs of more than two persons shall be monitored, for instance, two persons sleeping near to each other. In this case, for each of the two persons the region of interest information refers to the region of the bed in which the person is expected to be most of the time during the night. Moreover, in this case a selecting unit is adapted to select and/or modify the radiofrequency sensing mode individually for each of the two regions of interest. Accordingly, selecting and/or modifying the radiofrequency sensing mode based on region of interest information allows to apply the system even in cases in which a very accurate differentiation of sensing signals is necessary.

In an embodiment, if the environmental information indicates at least one possible radiofrequency signal propagation path between network devices of the at least a part of the network that contains a shallow reflection on a horizontal plane, the selection unit is adapted to select as radiofrequency sensing mode an RSSI-based sensing mode at least for the part of the network. For example, if the environmental information indicates the presence of a flat and reflective surface that can lead to a shallow reflection, for instance, on the flat reflective surface, it can be shown that the RSSI-based sensing mode will provide more accurate sensing results. A shallow reflection in this context can be defined as a reflection that does not allow the reflected radiofrequency signal to be detected by the network device having sent the radiofrequency signal, i.e. that does not allow a reflected radiofrequency signal to go back into a direction of the incoming radiofrequency signal. In particular, this condition is fulfilled if the incoming radiofrequency signal and the reflected radiofrequency signal beams form an angle of more than 90°. Formulated otherwise, this condition can be regarded as being fulfilled if the angle between the incoming radiofrequency signal beam and a reflective surface is below 45°, preferably below 30°. Generally, the selecting unit can be adapted to determine if this condition is fulfilled, for instance, by utilizing a simulation as described above, or by utilizing other rules, for instance, lookup tables that indicate relative positions and physical properties of surfaces in relation to at least the part of the network, i.e. in relation to at least the part of the network devices that lead to a fulfilment of the above condition.

In an embodiment, if the environmental information indicates a high radiofrequency signal attenuation in the environment of the network, the selecting unit is adapted to select as radiofrequency sensing mode an RSSI-based sensing mode. In this context, a high attenuation can be defined with respect to the signal to noise ratio of the received radiofrequency signal. In particular, for a specific application of the system, an attenuation in the environment of the network can be regarded as high if the attenuation results in a signal to noise ratio of the received radiofrequency signal that is not suitable for the intended application. For example, if it is intended to apply the system for movement detection, a lower signal to noise ratio can be tolerated and thus a higher attenuation as whether the system is intended to by applied for breathing or heart rate detection.

In an embodiment, if the environmental information indicates non-homogeneous surface materials in the environment of the network, the selecting unit is adapted to select as radiofrequency sensing mode a CSI-based sensing mode. Non-homogeneous surface materials can refer, for instance, to surface materials that include within length scales that lie below a wavelength of the radiofrequency signal materials with different physical properties. For example, a wall on which a plurality of decorative objects like pictures, mirrors, etc. are hanging consists of a plurality of materials with different properties, for instance, the surface of the mirror has different properties than the surface of the concrete wall and also than the surface of the pictures. In such embodiments, it has been found by the inventors that utilizing a CSI-based sensing mode, in particular, a modified CSI-based sensing mode, leads to much more reliable and accurate results for the radiofrequency sensing in the environment of such a wall. In a preferred embodiment, if the environmental information indicates a leakage of radiofrequency signals through a part of the non-homogeneous wall materials, the selecting unit is adapted to modify the CSI-based sensing mode. For example, a part of the wall comprising glass, like windows, can lead to the radiofrequency sensing signals also propagating into other areas beyond the intended sensing area and thus to a leakage of the radiofrequency signals. Such a leakage can lead to an influence of subjects on the radiofrequency signal outside an intended sensing area and thus to inaccurate sensing results. Utilizing a CSI-based sensing mode allows in this case to identify propagation paths that are potentially influenced and to modify the CSI-based sensing mode accordingly. Preferably, the modifying comprises identifying radiofrequency signals with signal paths having a signal strength that is lower than a predetermined signal strength and ignoring these radiofrequency signals during a radiofrequency sensing.

In a preferred embodiment, the surfaces for which an environmental information is provided refer to surfaces of an enclosure of at least a part of an area in which the network is provided. For example, the enclosure can refer to walls of a room containing, for instance, windows or doors, a ceiling, a floor, but also to walls that do not go to a full ceiling height such as, for instance, the walls of a changing room in a fashion retail, the walls of a toilet stall, cubical dividers, etc. However, additionally or alternatively, the surfaces for which environmental information is provided can also refer to the surfaces of objects in an environment of the network, for instance, of a table, a desk, a couch, a chair, a screen, etc. Preferably, the environmental information comprises at least one of a LiDAR scan of the environment, a panoramic image scan, a building plan and/or an image of at least a part of the environment of the network.

In a further aspect of the present invention a network is presented, wherein the network comprises a) a plurality of network devices adapted to perform a radiofrequency sensing, wherein the network devices are adapted to perform different radiofrequency sensing modes, and b) a system as described above.

In a further aspect of the present invention a method for controlling a radiofrequency sensing of a network comprising a plurality of network devices is presented, wherein the network is adapted to perform different radiofrequency sensing modes, wherein the method comprises a) providing environmental information, wherein the environmental information is indicative of a physical property of one or more surfaces in an environment of the network, b) selecting and/or modifying at least one of the radiofrequency sensing modes to be performed as radiofrequency sensing by at least a part of the network, wherein the at least one radiofrequency sensing mode is selected and/or modified based on the environmental information, and c) controlling the at least a part of the network to perform the at least one selected and/or modified radiofrequency sensing mode.

In a further aspect of the present invention a computer program product for controlling a radiofrequency sensing of a network is presented, wherein the computer program product comprises program code means causing a system as described above to execute a method as described above.

It shall be understood that the system as described above, the network as described above, the method as described above and the computer program product as described above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
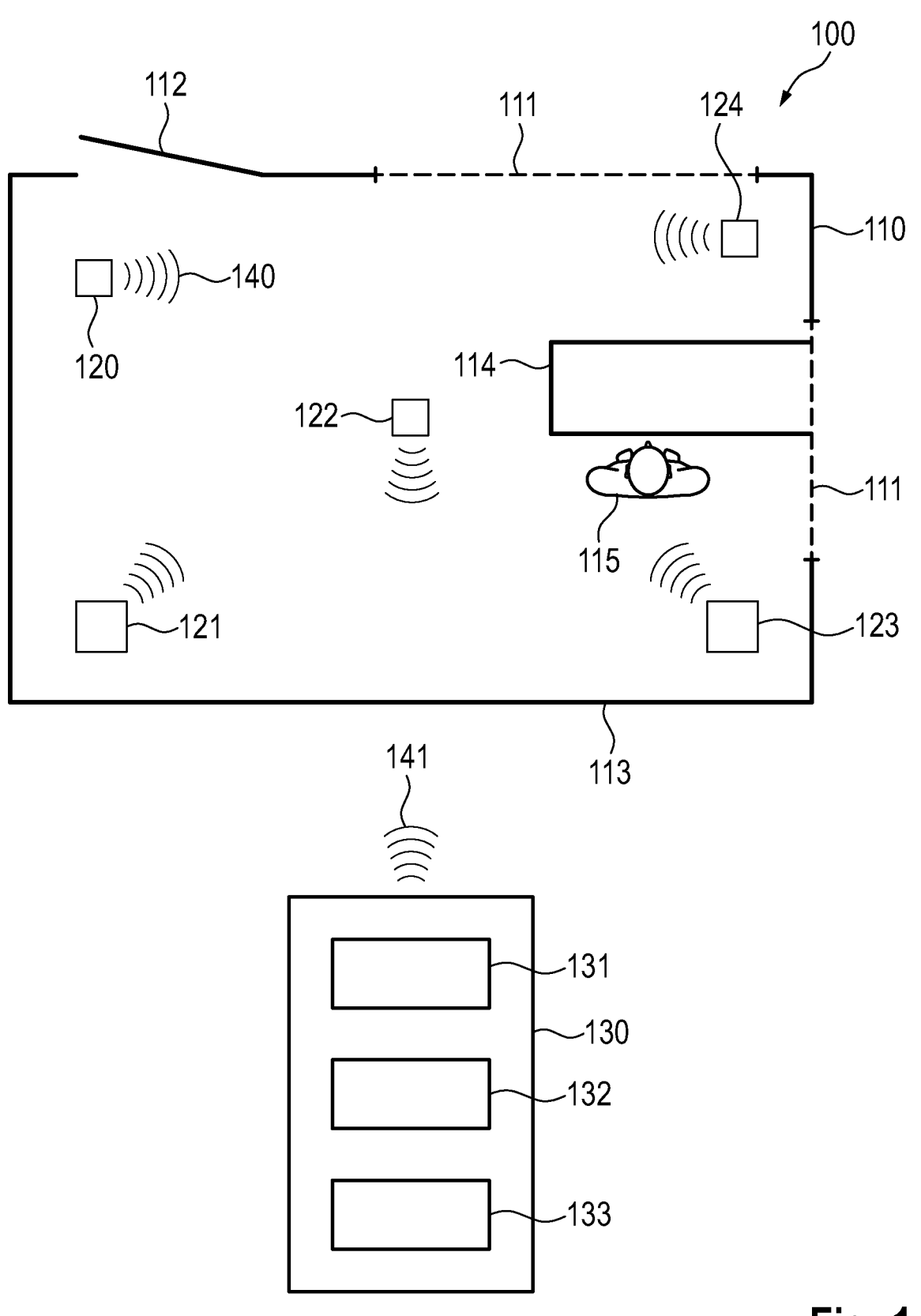
FIG. 1 shows schematically and exemplarily an embodiment of a network comprising a system for controlling the network.

FIG. 1 shows schematically and exemplarily a network 100 comprising a system 130 for controlling a radiofrequency sensing of the network 100. The network 100 comprises network devices 120, 121, 122, 123, 124 distributed in a room 110. In this exemplary embodiment, the network devices 120, 121, 122, 123, 124 refer to lights provided within the room for lighting the room, for instance, to luminaires on a ceiling of the room. In addition to their lighting functionality, the network devices 120, 121, 122, 123, 124 are adapted to perform radiofrequency sensing within the room 110. In particular, for performing radiofrequency sensing the network devices 120, 121, 122, 123, 124 are adapted to send and receive radiofrequency signals. Preferably, the radiofrequency signals refer to communication signals utilized for a communication within the network formed by the network devices 120, 121, 122, 123, 124, however, the radiofrequency signals can also refer to signals only sent for the purpose of radiofrequency sensing without comprising an additional communication functionality. Generally, the network 100, i.e. at least some of the network devices 120, 121, 122, 123, 124, is adapted to perform different radiofrequency sensing modes. The performable radiofrequency sensing modes refer, preferably, to at least one of a CSI-based sensing mode, an RSSI-based sensing mode and a Doppler-based sensing mode. Preferably, the sensing mode of the network 100 refers to a CSI-based sensing mode, since this allows for the most accurate sensing. However, the sensing mode can then be changed from the CSI-based sensing mode to any of the other sensing modes.

In this example, the network 100 further comprises a system 130 for controlling the radiofrequency sensing of the network 100. In this exemplary embodiment, the system 130 is provided as a standalone device, i.e. is not integrated in one or more of the network devices 120, 121, 122, 123, 124. In this case, the system 130 is adapted to communicate with at least one of the network devices 120, 121, 122, 123, 124, for instance, with the network device 120, preferably by utilizing radiofrequency signals 140, 141. However, the system 130 can also be adapted to communicate with all of the network devices 120, 121, 122, 123, 124 utilizing any wired or wireless communication method. Moreover, in another embodiment, the system 130 can also be integrated as part of the hardware and/or software of one or more of the network devices 120, 121, 122, 123, 124.

The system 130 comprises an environmental information providing unit 131, a selecting unit 132 and a controlling unit 133. The environmental information providing unit 131 is adapted to provide environmental information. The environmental information provided by the environmental information providing unit 131 is indicative of a physical property of one or more surfaces in an environment of the network 100. For example, the environmental information provided by the environmental information providing unit 131 can be indicative of a physical property of surfaces in the room 110. For example, room 110 comprises a wall surface 113 made from concrete, a door surface 112 made from wood and two window surfaces 111 made from thermally isolating glasses. The environmental information provided by the environmental information providing unit 131 can then indicate, for instance, the different materials from which these surfaces are made. However, the environmental information can also comprise respective attenuation coefficients or reflection coefficients for each of these materials. Moreover, in a preferred embodiment the environmental information further comprises the locations, sizes, and orientations of the surfaces in the room 110. For example, the environmental information can be generated based on a LiDAR scan of the room 110 and can then be provided by the environmental information providing unit 131. However, in other examples also a floor plan of the room 110 or images of the room 110, for instance, provided by a user, can be used as environmental information or to derive the environmental information. In addition to the environmental information of surfaces of the enclosure of the room 110, also environmental information with respect to objects within the room 110 can be provided. For example, environmental information indicative of the physical properties of the surfaces of a desk 114 provided in the room 110 can be provided. However, it is preferred that the environmental information is unrelated to a radiofrequency sensing target, for instance, to a person 115 who shall be monitored using radiofrequency sensing, for instance, by applying a vital sign monitoring.

The selecting unit 132 is adapted to select and/or modify one or more radiofrequency sensing modes to be performed as radiofrequency sensing by at least a part of the network 100, i.e. by at least some of the network devices 120, 121, 122, 123, 124. The network 100, i.e. the network devices 120, 121, 122, 123, 124, can be adapted to perform as radiofrequency sensing mode at least one of a CSI-based sensing mode, an RSSI-based sensing mode and a Doppler-based sensing mode. Generally, most of the different radiofrequency sensing modes can be applied using the same radiofrequency signals such that the main difference between the different radiofrequency sensing modes lies within how the received radiofrequency signals are further processed for radiofrequency sensing, for instance, whether an RSSI value, CSI information or frequency spectrum is determined from the received radiofrequency signal. However, the different radiofrequency sensing modes can also be modified to utilize different radiofrequency sensing signals, for instance, radiofrequency sensing signals in a different wavelength range. The selecting unit 132 is then adapted to select and/or modify the radiofrequency sensing mode that shall be performed by at least the part of the network 100 based on the environmental information provided by the environmental information providing unit 131. For example, the selecting unit 132 can use predetermined rules stating conditions under which the network 100 shall change from one radiofrequency sensing mode to another radiofrequency sensing mode and how, under specific conditions, a radiofrequency sensing mode shall be modified. In a preferred embodiment, the selecting unit 132 can utilize a simulation of the propagation paths of the radiofrequency signals between the network devices 120, 121, 122, 123, 124. For example, such a simulation can use known physical laws of wave propagation and interaction with respective surfaces to simulate the propagation paths. The environmental information can, for instance, be integrated into such a simulation to provide the respective physical properties, like, materials, locations, orientations, and sizes of the surfaces on which the radiofrequency signals are reflected, scattered and/or attenuated. For example, a LiDAR scan of the room 110 can be used to identify all the surfaces in the room 110 and optionally images of the room 110 can be utilized to provide information on the materials of these surfaces. The simulation can then use known physical laws to simulate, for instance, possible propagation paths of a radiofrequency signal sent from a network device, exemplarily the network device 120, to a network device, exemplarily the network device 124. The simulated propagation paths allow to derive, for instance, if a CSI-based sensing may be possible in room 110 or if an attenuation of some of the simulated propagation paths is expected to be above a predetermined threshold for which it has been observed that an RSSI-based sensing would provide better sensing results. Accordingly, the selecting unit 132 can in this case be adapted to select and/or modify the radiofrequency sensing mode based on the simulated propagation paths.

The controlling unit 133 is then adapted to control the at least a part of the network, i.e. the network devices belonging to at least the part of the network 100, to perform the selected and/or modified radiofrequency sensing mode. For example, the controlling unit 133 can communicate using signals 141, 140 with the network devices 120, 121, 122, 123, 124 such that the network devices 120, 121, 122, 123, 124 process received radiofrequency signals in accordance with the selected and/or modified radiofrequency sensing mode.

Figure 2:
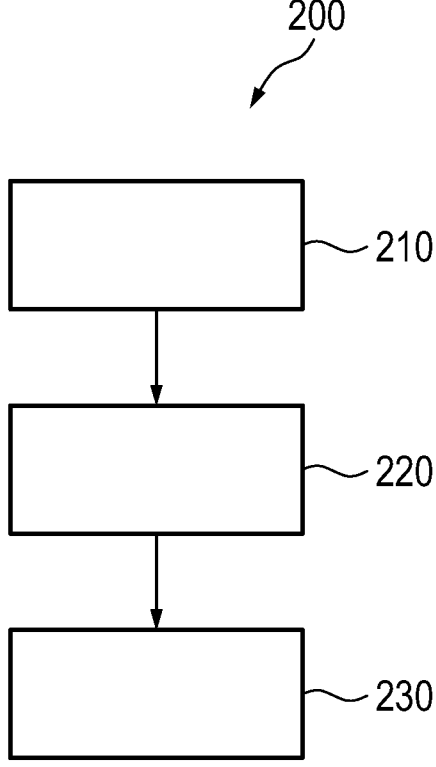
FIG. 2 shows schematically and exemplarily an embodiment of a method for controlling a network.

FIG. 2 shows schematically and exemplarily an embodiment of a method 200 for controlling a radiofrequency sensing of a network, like network 100. The method 200 comprises a first step 210 of providing environmental information, wherein the environmental information is indicative of a physical property of one or more surfaces in an environment of the network, like network 100. For example, as explained above, the environmental information can refer to providing physical properties of surfaces within the room 110 in which the network 100 is positioned. In a second step 220, the method 200 comprises selecting and/or modifying one of the radiofrequency sensing modes to be performed as radiofrequency sensing mode by at least a part of the network, wherein the radiofrequency sensing mode is selected and/or modified based on the environmental information. For example, the selecting and/or modifying can be performed with respect to the examples explained above in accordance with the selecting unit 132. In a last step 230, the method 200 comprises controlling the at least a part of the network to perform the selected and/or modified radiofrequency sensing mode.

In the following, some preferred embodiments of the invention will be described in detail. In a first embodiment, the system can be applied to concurrently tracking the sleep of two persons sharing the same bed. For this embodiment, the environmental information is indicative of building material types and their respective location in a room. Based on the environmental information, the dominant radiofrequency signal multi-paths can be determined, for instance, by utilizing a respective simulation. The selecting unit is then adapted to select and modify a CSI-based sensing mode for breathing detection capable of concurrently tracking the sleep of the two persons sharing the same bed. Generally, it has been found that environmental information indicative of, for instance, building materials, allows for improved context awareness radiofrequency sensing applications such as breathing detection, gait detection, gesture detection and heart rate detection from a distance. Current state-of-the-art breathing detection/sleep monitoring solutions are, for instance, not capable of concurrently perform radiofrequency sensing for two people sharing the same bed.

For this specific application the network device can, for instance, refer to a first and second table light next to a first and second person's head, respectively, as well as to a third central light mounted farther from those two, e.g. a ceiling-mounted light. The environmental information is then, preferably, indicative of building materials types as well as their respective locations in the bedroom with respect to the three lights. This environmental information can be provided, for instance, by prompting a user to initiate a panoramic image scan or to input this information directly. For example, the specific building material type, e.g. wood vs. brick vs. metal, can be inferred by the selecting unit from panoramic image by their shape, texture, colour or size or by user input.

Subsequently, the selecting unit can be adapted to estimate the dominant radiofrequency signal multi-paths between the first light and third light, i.e. for the "first channel", and the second light and third light, i.e. for the "second channel". In addition, information on the regions of interest, e.g. left side of bed and right side of bed, can be provided, for instance, by a user input. The selecting unit can then utilize, for instance, a look up table detailing how each common building material interacts with radiofrequency signals. Finally, based on the environmental information indicative of the building materials and spatial arrangement, the selecting unit can be adapted to select as radiofrequency sensing mode a CSI-based sensing mode and/or to modify the CSI-based sensing mode such that a first subset of wireless multi-paths from the first channel is selected which are associated with the first person lying on a first side of the bed, but avoid or limit interference from the second person, and a second subset of wireless multi-paths of the second channel is selected which are predominantly associated with the second person lying on a second side of the bed. In particular, based on the knowledge of the spatial arrangement, the building materials and their interaction with the wireless signals, the selecting unit can be adapted to associate based on the attenuation and signal delay which multi-paths extracted by the CSI measurements are associated with which multi-path in the physical world. Optionally, the selecting unit can be adapted to visualize the multi-paths during the setup of the sensing mode, for instance, on a display of a smart phone, such that a user can adapt or modify the simulated multi-paths.

Generally, it is preferred that the controlling unit is adapted to identify the presence of a blind spot of sensing within a sensing area, for instance, based on information provided from walk tests during the performing of a sensing mode. In this case, the controlling unit can be adapted to prompt a user to initiate a providing of environmental information, for instance, by performing a proposed analysis of the building materials in the vicinity of the blind spot. The selecting unit can then, for instance, modify the CSI-based sensing mode based on the provided environmental information to finetune the radiofrequency sensing performance.

In a further preferred embodiment, the selecting unit is adapted to select an RSSI-based sensing mode over a CSSI-based sensing mode if a radiofrequency signal path between two network devices includes a shallow-angle signal reflection containing a dominant portion of the totally transmitted radio power. Generally, CSI-based sensing is capable of isolating one specific multipath of interest, for instance, by modifying the CSI-based sensing mode accordingly. For instance, a radiofrequency signal channel between a first network device and a second network device can consist of 12 different signal multi-paths. Usually the direct signal path is preferred for usage in radiofrequency sensing as it provides the best signal to noise ratio for human presence sensing despite of actually receiving only $\frac{1}{12}$ of the totally emitted signal power emitted by the network device. RSSI-based sensing modes, to the contrary, per definition utilize an average of the received signal from all the 12 multi-paths between the two network devices and hence is strongly impacted by reflections and losses due to building materials and physical obstacles. However, it can be shown that CSI-based sensing modes often provide a decreased sensing accuracy in situations where the radiofrequency sensing encompasses a strong shallow-angle reflection, for instance, from a floor or a large marble kitchen countertop. For instance, the radiofrequency signal path in a living room may start at a transmitting standing lamp as network device next to a couch and the signal reaches at a shallow-angle a concrete floor in front of a dining table several meters away. The signal is then reflected with little attenuation by the concrete floor and then reaches the receiving table lamp being also a network device located at the other end of the living room. Compared to the other radiofrequency signal multi-paths in the living room involving potentially multiple reflections, this specific via-the-floor path, i.e. "second path", is special as the total path length is only slightly longer than the direct, i.e. "first path", without reflection between the two lights. Hence, the CSI-based sensing mode can have difficulties to distinguish the second path via the floor from the first path as the first and second path have almost identical time-of-arrivals and similar signal amplitudes. In such a situation in a CSI-based sensing mode, the first and second path may accidentally be aggregate. Consequently, if the floor reflection of the second path is changed, e.g. due to an object lying on the marble kitchen countertop or a wet surface of the floor, the CSI-based sensing mode looking at the accidentally lumped to a first-plus-second paths notices an increase over the baseline situation and wrongfully infers that a stationary person is present. In the case of utilizing a RSSI-based sensing mode, the wireless radiofrequency signal arriving at the second table lamp is still increased due to the modified reflection due to the presence of the physical object on the surface. However, as the "odd" first wireless path constitutes only a small contribution to the overall integral RSSI signal arriving at the receiver light, it does in the overall picture not contribute significantly to the decision making in an RSSI-based sensing mode. Thus, for such a situation it is preferred that the selecting unit is adapted to determine based on the environmental information such a shallow-angle reflection condition and to select as radiofrequency sensing mode an RSSI-based sending mode.

On the other hand, if the dominant reflection of the wireless radiofrequency signal does not occur at a horizontal floor but at a vertically oriented obstacle, e.g. wall, glass mirror or side of a bookshelf, this will result in a significant path length difference between the reflected signal path and the direct signal path between the transmitter and receiver network devices. Hence, also in a CSI-based sensing mode it can be easily distinguished, e.g. via time of arrival analytics, which received signal belongs to the direct signal path and which to the reflected signal path via a side wall. Hence, in this case a CSI-based sensing mode does not suffer from the issues experienced for the floor reflection and thus is as reliable as the RSSI-based sensing mode. In this case, the selecting unit can be adapted to select as sensing mode a CSI-based sensing mode, since this generally provides a higher sending accuracy.

In an embodiment, the selecting unit is adapted to select an RSSI-based sensing mode for spaces with high radiofrequency signal attenuation due to the presence of certain building materials in the radiofrequency signal path between two network devices. RSSI-based sensing modes rely on the integral, i.e. aggregated, signal comprised of all wireless signal multi-paths between the network devices. Thus, an RSSI-based sensing mode works more reliably than CSI-based sensing mode whenever the radiofrequency sensing signal between two network devices is attenuated to such extent that a CSI-based sensing mode is compromised. In practice, this situation may occur due to various reasons. For example, if the radiofrequency signal has to transmit over a long distance, e.g. in a garden setting, or if an inter-floor sensing is utilized, e.g. in office applications, if network devices on a first floor are used to sense for people walking on an above lying second floor, further, if highly absorbing building materials are present in the sensing area that can effectively rendering a subset of the signal multi-paths useless for CSI-based sensing. In the above cases, the attempt to analyse each of the multi-path signal components of a CSI signal separately, as done by CSI-based sensing, may lead to inconclusive results due to insufficient signal to noise ratio of most available signal multi-paths. Even if the sensing algorithms may provide useful data, it may be more prone to false positives or false negatives, or incorrect estimation of metrics like breathing rate or heart rate and thus comprises a decreased accuracy and reliability.

In contrast thereto, an RSSI-based sensing mode analyses the aggregated received radiofrequency signal, which enables to achieve conclusive results due to enough signal to noise ratio, albeit with less rich information. Thus, it is preferred that the selecting unit is adapted to select for a room for which the environmental information indicates the presents of highly attenuating building materials an RSSI-based sensing mode instead of a CSI-based sensing mode.

In an embodiment, the selecting unit is adapted to select a CSI-based sensing mode for rooms with non-homogeneous wall materials, for instance, to circumvent "corridor problem" in offices. In CSI-based sensing modes, it is possible to deliberately exclude a first subset of undesired signal multi-paths, for instance, the CSI-sensing mode can be modified to deliberately exclude those signal multi-paths which, for instance, judged based on the proportionally low arriving signal strength at a network device, clearly have gone twice through a wall. This allows in a modified CSI-based sensing mode false triggers related to the aptly named "corridor problem" can be mitigated. Thus, it can be avoided radiofrequency sensing signals leaking from a room into a hallway and back into the room can lead to passers-by in the corridor creating false occupancy triggers within the room.

Generally, an attenuation of the undesired multi-paths, for instance, involving an outside of the room, depends on the building material. For example, a glass wall in a meeting room attenuates a 2.4 GHz radiofrequency signal only a little bit, while a brick wall greatly attenuates it. Further examples for the attenuation of materials with respect to radiofrequency signals are shown in the table below. In particular, the table shows transmission and reflection measurements from window glass and a red brick wall comprised of 17 bricks of 203 mm (w)×51 mm (h)×102 mm (d) at different common radiofrequency signal frequencies.

| | Transmission coefficient (dB) | | Reflection coefficient (dB) | |
|---|---|---|---|---|
| | 2.3 GHz | 5.25 GHz | 2.3 GHz | 5.25 GHz |
| Glass (2.5 mm thick) | −0.5 | −1.69 | −11.29 | −4.9 |
| Red Brick | −4.43 | −14.62 | −12.53 | −8.98 |

Thus, if, for instance, a meeting room has a glass wall to a corridor, an RSSI-based sensing mode will suffer from false triggers by passers-by, while if the wall is made from metal-coated thermal glass or a brick, an RSSI-based sensing mode will work reliably. Thus, the selecting unit can be adapted to utilize the environmental information to determine if a situation with possible leaking radiofrequency signals might occur and to then select a modified CSI-based sensing mode. Generally, the environmental information indicative of a spatial arrangement of a room's building material can be obtained from building information modelling (BIM) files or from a user input. Preferably, the selecting unit is adapted to utilize the environmental information to select an RSSI-based sensing mode for a part of the network devices located closest to enclosures comprising glass-like materials, while selecting a CSI-based sensing mode for a part of the network covering a sensing area away from such enclosures. In this example, a modification of the CSI-based sensing mode during system setup can be avoided.

Currently radio frequency sensing is divided into a first group of systems using CSI-based sensing modes and a second group of systems using RSSI-based sensing modes. The inventors recognized that even if an advanced radio is capable of CSI-based sensing, there may be certain application-specific circumstances where building materials have such drastic effect on the accuracy of CSI-based sensing that simple RSSI-based sensing outperforms the CSI-based sensing. On the other extreme, the inventors recognized that detailed tailoring of CSI-based sensing may be occasionally required e.g. for performing concurrently breathing detection of two persons sharing the same bed.

RSSI is a well-adopted measure of the overall attenuation of wireless communication signals between two network devices. On the other hand, in recent years CSI has emerged as alternative measure, wherein a CSI measure represents how wireless signals propagate in the radiofrequency signal channels from a transmitter to a receiver at certain carrier frequencies along multiple spatial signal paths. CSI-based sensing hence captures the signal characteristics of the nearby environment, as the amplitude and phase of the CSI measure are impacted by multi-path effects including amplitude attenuation and phase shift of the radiofrequency signals. For example, for a modern WiFi system with MIMO-OFDM, the CSI measurement provides a 3D matrix of complex values representing the amplitude attenuation and phase shift.

Time-series of multiple CSI measurements capture, how wireless signals travel through surrounding physical objects and humans in time, frequency, and spatial domains. Hence, prior art teaches that transmitting a wireless signal through a wireless multipath channel and using artificial intelligence (AI) algorithms for analyzing the time-series of CSI measurements enables a wide range of different radiofrequency sensing applications. For example, CSI amplitude variations in the time domain have different patterns for different humans, activities, gestures, etc., which can be used for human presence detection, motion detection, activity recognition, gesture recognition, and human identification.

Prior art also teaches that the observed CSI phase shifts in the spatial and frequency domains, i.e., transmit/receive antennas and carrier frequencies are related to signal transmission delay and arrival direction, which can be used for leveraging radiofrequency sensing in addition to occupancy and activity detection, also for human localization and tracking across a building space. CSI phase shifts in the time domain may have different dominant frequency components which, for instance, are used in prior art to estimate a breathing rate with CSI-based radiofrequency sensing.

As both CSI-based sensing modes and RSSI-based sensing modes are relying on the same physical network devices, assuming both are being extracted from the same protocol, e.g. WiFi, as well as use the same wireless radiofrequency signals to "probe" a space, the physics of the signal propagation for the two sensing modes is identical, i.e. a radiofrequency multi-path channel within a room does not change just because we want to either extract CSI data or RSSI data from the received radiofrequency signal. In addition, both RSSI- and CSI-based sensing modes analyze a time series of a radiofrequency signal channel between two network devices. However, compared to RSSI-based sensing modes, a CSI-based sensing mode can extract metrics from each different signal subchannel which can be related to the multi-path characteristics of the physical building space. CSI amplitude and phase are impacted by radiofrequency signals from multiple paths within a room rather than a single signal path. Hence, unlike RSSI referring to a simple measurement natively performed by any radiofrequency receiver for "house-keeping" purposes, for CSI-based sensing modes the multi-path information has to be first derived from the measured raw CSI data as provided by the radiofrequency receiver. For instance, a 20 MHz WiFi channel may have 64 CSI subcarrier frequencies. Since each of these sub-frequencies interacts at least somewhat different with the material objects, e.g. brick wall of a room or upholstery of a couch, the analysis of how the 64 subcomponents integrally behave, e.g. their relative differences, are indicative of a multi-path behavior of the building space.

Figure 3:
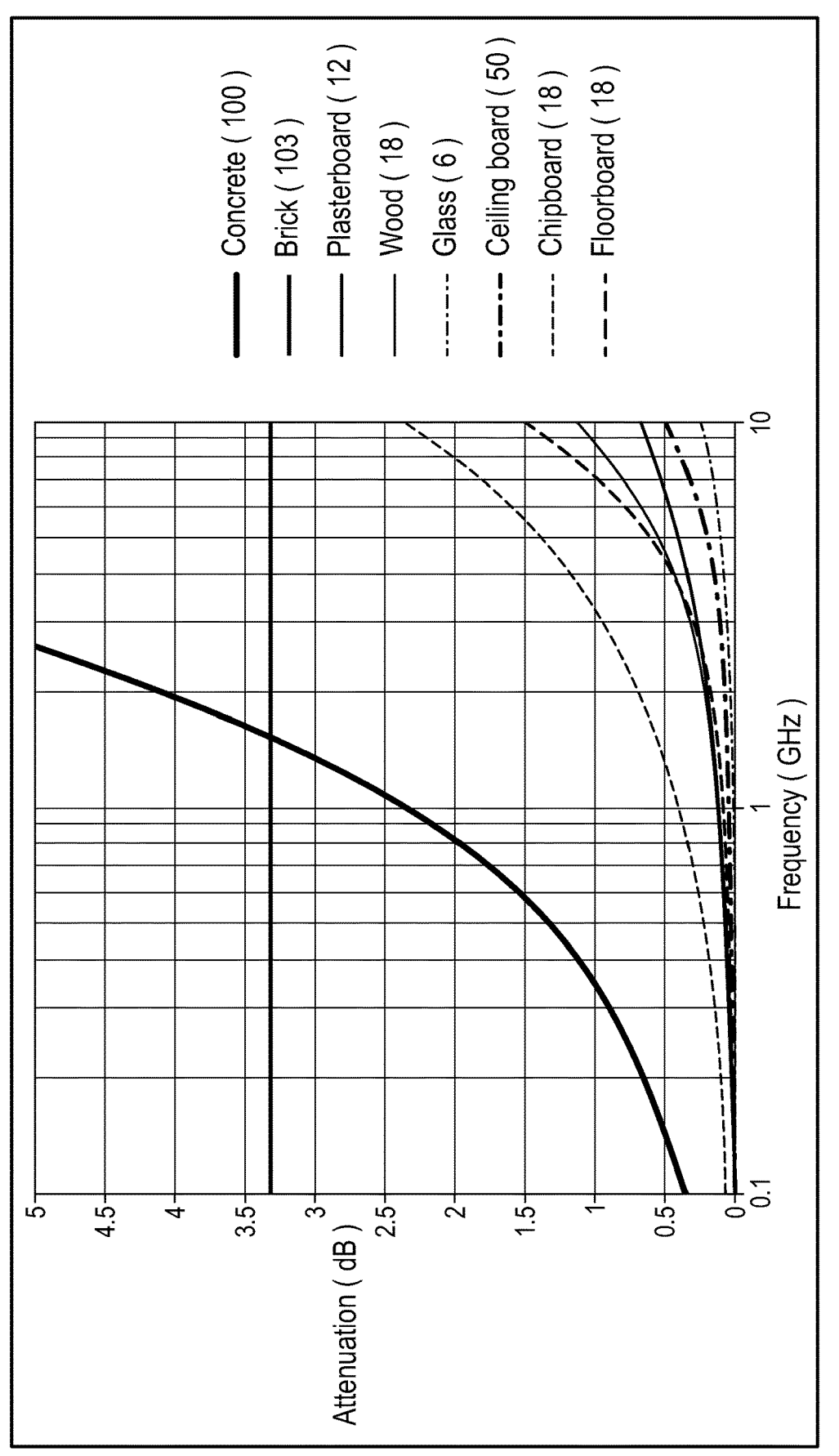
FIG. 3 shows exemplarily the attenuation of radiofrequency signals for different materials.

To illustrate the strong influence of building materials on wireless channel metrics, which are crucial for accurate radiofrequency sensing, in the following a review of how radio waves interact with different commonly used building-materials is provided. Radio waves are propagated through electromagnetic radiation and interact with the environment by reflection, refraction, diffraction, absorption, polarization and scattering. FIG. 3 shows measurements of an attenuation for various building materials within a typical frequency range used by radiofrequency sensing applications. From FIG. 3 it can be concluded that the differences in attenuation among different materials are very pronounced. Hence, the construction of a room as well as the spatial arrangement and integral-surface-area of each present building material type can influence a radiofrequency multi-path signal characteristic of this particular room. For a typical wireless link budget of 90 dB, defined by max. Tx power to min. Rx sensitivity, total, a difference in wireless attenuation of just a couple dB caused by a building material is well within the detectable range of a radiofrequency sensing system. Metallic materials present in an area strongly affect the radiofrequency signal multi-path propagation. Over the last decades, metallic construction materials are used increasingly often, for instance, to improve a thermal isolation performance of houses. For example, in most modern houses nowadays aluminium foils are incorporated into foil-backed plasterboard and insulation boards to provide low thermal emissivity as well as vapor resistance, while having minimal impact on the room dimensions. For instance, "multi-foil" building products are often stapled to roof eaves, cavity-walls or are laid on loft floors. As these multi-foil building materials may typically consist of more than ten layers of aluminium foil and insulation, a dormer window space or an attic of a house may exhibit very different radiofrequency sensing signal propagation pattern compared to the same house's living room, which does not feature aluminium building material. Similarly, mirrors, e.g. in a bathroom or dressing room, are known to cause strong reflections. Similarly, most modern houses feature low emissivity window-glazing to improve the thermal performance by adding a thin metallic or metallic oxide layer to one of the glass panes. The thin metallic layer on the window glass affects the wireless signal propagation of the subset of radiofrequency multipath transmissions involving the window area. As changes in construction methods and materials have deteriorated the building penetration losses of cellular signals, modern buildings now also deliberately create a small portion of certain walls on purpose such that cellular signals can penetrate freely to the inside of the house as well from a first room to a second room. However, these "odd" spots in the building walls inadvertently also influence a radiofrequency sensing signals multi-path propagation, for instance, allowing radiofrequency sensing signals to inadvertently leak out of a room, e.g. from a kitchen through the wall to an adjacent living room.

Hence, it is advantageous for a radiofrequency sensing system to take account of the building materials used in a room, specifically understanding how specific portions of the room reflect, absorb or scatter the radiofrequency signals. The two most easily understandable interaction mechanisms between radio waves and building materials are reflection and absorption. For all practical purposes, large metallic structures, such as steel beams and radiators in a room, can be regarded at the radiofrequency sensing frequencies of interest as perfect reflectors. Hence, unlike thin metal films described earlier, these thick metal structures do not allow significant radiofrequency sensing signal to pass through. Any reflections of the radiofrequency sensing signal, for instance, by the aforementioned large metallic structures, create additional multi-path components to the radiofrequency signal transmission channel between the two radiofrequency sensing network devices. In practice, the strongest reflection effects are produced by large, smooth, planar building objects, such as walls, floors, ceilings, windows, doors, as the surfaces of these objects typically are fairly smooth at the typical radiofrequency sensing frequencies used, and thus these objects very strongly reflect the wireless radiofrequency sensing signals.

Diffraction is yet another mechanism that can influence radiofrequency sensing multi-path signals in a room. Diffraction of radio waves occurs where two different building materials meet, or where there is a sharp change in the shape of the surface of a material. In practice, diffraction of radiofrequency signals occurs in buildings typically at corners and edges where two or more walls/ceilings meet, and at the edges of windows and doors where wood or glass panels meet walls. While diffraction is generally a "weaker" mechanism than transmission for getting radiofrequency signals from one sub-space in the building to another, prior art also teaches that diffraction occasionally can be even the dominant mechanism for providing cellular or home-WiFi radio coverage at certain location inside a room or building. For instance, diffraction may significantly contribute to deliver wireless radiofrequency signals to a blind spot area behind a highly attenuating metal wall or large metal object. In this specific "blind spot" location, the radiofrequency signal diffracted from elsewhere in the room may even be much stronger than the radiofrequency signal reaching the receiver directly through the obstructing object or via reflections. Prior art teaches that the strength of a diffracted wireless radiofrequency signal depends principally on the path geometry, shape of the diffracting edge and the frequency. It also depends to some extent on the electrical properties of the material comprising the diffracting edge, e.g. corner of gypsum wall sticking into room reinforced with a long metal stripe, but this dependence is generally weaker than the other factors.

Another interaction mechanism between sensing radio waves and building materials is wireless scatter. Prior art teaches that the large-sized clutter such as furniture and people present in the room can often be modelled as scatter sources even at relatively low frequencies such as 2.4 GHz. In addition, wireless scatter can also occur when a radio wave impinges on a rough surface. Whether a surface appears rough or smooth at radiofrequencies depends on the relative sizes of surface irregularities compared to the wavelength, and on the angle of incidence of the radio wave. At 2.4 GHz, the wavelength is approximately 12.5 cm, hence, if the irregularities are less than a tenth of a wavelength, 1.25 cm in the case of 2.4 GHz, the surface can be considered smooth at all angles of incidence. At the wavelengths currently used by network devices for radiofrequency sensing most internal and external walls can therefore be considered as smooth and the effects of scatter is negligible. However, in the future, for 60 GHz WiFi ($\lambda$=0.5 cm), surface irregularities of 0.5 mm will already cause noticeable scatter in the radiofrequency signal propagation. Hence, it is preferred that the selecting unit can take also 60 GHz WiFi sensing scatter effects into account, e.g. when in an application aiming at detecting the clutter, e.g. kitchen tools, on a smooth tabletop.

In general, CSI-based sensing modes are preferred, as these provide in principle more insights than RSSI-based sensing modes. However, the inventors have found that under certain circumstances RSSI-based sensing modes are preferred due to the presence of certain building materials greatly influencing the room's multi-channel behavior. Similarly, for certain high-value sensing applications, e.g. breathing or heartrate detection, it may be required to purposefully modify a CSI-based sensing mode by selecting a sub-set of radiofrequency signal multi-paths in a room to be used by the CSI-based sensing mode.

Thus, the inventors have noted that, in practice, selection criteria for when to apply RSSI vs. CSI-based sensing modes strongly depends on the physical properties of a room, like surfaces, materials, shape. Hence, the system as described in the embodiment above is adapted to first utilize the environmental information, for instance, to analyze and localize the building materials present in a room, wherein the environmental information can be provided, for instance, via a panoramic scan, a LiDAR scan or a user-input during commissioning. Subsequently, the system can be adapted such that the collected building material information, for example, as environmental information, serves as input for a selecting unit that can utilize, for instance, the above proposed selection criteria, for selecting when to apply a CSI-based sensing mode over a simple, less-computing-intensive RSSI-based sensing mode and/or when to modify one of the radiofrequency sensing modes. For example, as already described above, the selecting unit can be adapted to select an RSSI-based sensing mode in situations where the radiofrequency sensing signal encompasses a strong shallow-angle reflection from a hard floor. Further, the selecting and/or modifying of the radiofrequency sensing modes is also useful for determining optimal radiofrequency sensing settings for concurrently monitoring the breathing of two people sharing the same bed.

Although the above exemplary embodiments referred mostly to the differentiation between RSSI- and CSI-based sensing, the same principles can also be applied to other radiofrequency sensing modes. For example, the selecting unit can be adapted to determine the expected spatial direction with respect to the dominant radiofrequency multipath signals based on the environmental information and to select a Doppler sensing mode, if it is expected that a sensing target will substantially be moving parallel with respect to the determined spatial direction, since this creates a relatively high Doppler shift. Such a situation may, for example, occur in a small corridor of an office building in which the movement direction is substantially determined by the corridor without much possibilities to move in other directions. In case the selecting unit determines that the sensing target substantially moves in a spatial direction perpendicular to the determined spatial direction or that a plurality of movement directions are possible, the selecting unit can be adapted to select an RSSI- and/or CSI-based sensing mode.

Moreover, if the environmental information also comprises information on the sensing target that indicates that the moving sensing target interacts relatively weak with radiofrequency signals, for instance, due to a low body mass, the selecting unit is preferably adapted to select a Doppler sensing mode. For instance, it is advantageous that a cat is tracked via Doppler sensing as it has a small body mass hence absorbing little but moves considerable. On the other hand, in a situation in which a breathing or heart rate detection is intended, the selecting unit can be adapted to determine based on the environmental information if radiofrequency signals can be detected with a suitable signal strength that are reflected from the chest of a person, for instance, sleeping in a bed. This determination can be based, for instance, on a simulation of the radiofrequency signal paths as described above. If this condition is fulfilled, it is preferred that the selecting unit is adapted to select a Doppler sensing mode, wherein if this condition is not fulfilled, it is preferred that the selecting unit selects an RSSI- or CSI-based sensing mode.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the environmental information, the selecting and/or modifying of the radiofrequency sensing mode, the controlling of the network devices, etc., performed by one or several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a system for controlling a radiofrequency sensing of a network. The network is adapted to perform different radiofrequency sensing modes, e.g. RSSI-, CSSI- or Doppler based modes. The system comprises a providing unit for providing environmental information, wherein the environmental information is indicative of a physical property of one or more surfaces in an environment of the network. A selecting unit is adapted for selecting and/or modifying a radiofrequency sensing mode to be performed by the network, wherein the radiofrequency sensing mode is selected and/or modified based on the environmental information, and a controlling unit is adapted for controlling the network to perform the selected and/or modified radiofrequency sensing mode. Taking the physical properties of surfaces in an environment into account and modifying and/or selecting the utilized radiofrequency sensing mode accordingly increases the reliability and the accuracy of the radiofrequency sensing.

The invention claimed is:

1. A system for controlling a radiofrequency sensing of a network, the network having a plurality of network devices, the network being adapted to perform different radiofrequency sensing modes, the system comprising:

an environmental information providing unit for providing environmental information, wherein the environmental information being indicative of a physical property of one or more surfaces in an environment of the network, the physical property being indicative of a material and/or a texture of the one or more surfaces;

a selecting unit for selecting and/or modifying at least one of the radiofrequency sensing modes to be performed as radiofrequency sensing by at least a part of the network, the at least one radiofrequency sensing mode being selected and/or modified based on the environmental information; and a controlling unit for controlling the at least a part of the network to perform the at least one selected and/or modified radiofrequency sensing mode, wherein, when the environmental information indicates at least one possible radiofrequency signal propagation path between network devices of the at least a part of the network that contains a shallow reflection on a horizontal plane, the selection unit is adapted to select as the at least one radiofrequency sensing mode an RSSI-based sensing mode at least for the part of the network, and the shallow reflection has a reflection that does not allow the reflected radiofrequency signal to be detected by the network device having sent the radiofrequency signal.

2. The system according to claim 1, wherein the network is adapted to perform as radiofrequency sensing modes at least one of a channel state information, CSI, based sensing mode, a received signal strength indicator, RSSI, based sensing mode and a Doppler based sensing mode.

3. The system according to claim 1, wherein the physical properties are indicative of an interaction of the surface with a radiofrequency signal utilized for the radiofrequency sensing.

4. The system according to claim 3, wherein the selecting and/or modifying comprises simulating propagation paths of radiofrequency signals between the network devices of at least the part of the network based on the environmental information.

5. The system according to claim 3, wherein the selecting and/or modifying is further based on regions of interest information indicative of the location of subjects of interest and/or objects in the environment in which the radiofrequency sensing is of interest.

6. The system according to claim 5, wherein the selecting unit is arranged for selecting and/or modifying at least one of the radiofrequency sensing modes to be performed as radiofrequency sensing by at least a part of the network for vital sign detection, gait detection and/or gesture detection of one or more persons, and the region of interest information refers to a region in which the one or more persons are present in a predetermined time period.

7. The system according to claim 2, wherein, if the environmental information indicates a high radiofrequency signal attenuation in the environment of the network, the selecting unit is adapted to select as radiofrequency sensing mode an RSSI-based sensing mode.

8. The system according to claim 1, wherein, if the environmental information indicates non-homogeneous surface materials in the environment of the network, the selecting unit is adapted to select as radiofrequency sensing mode a CSI-based sensing mode.

9. The system according to claim 8, wherein, if the environmental information indicates a leakage of radiofrequency signals through a part of a non-homogeneous wall materials, the selecting unit is adapted to modify the CSI-based sensing mode.

10. The system according to claim 9, wherein the modifying comprises identifying radiofrequency signals with signal paths having a signal strength that is lower than a predetermined signal strength and ignoring these radiofrequency signals during a radiofrequency sensing.

11. The system according to claim 1, wherein the environmental information comprises at least one of a LIDAR scan of the environment, a panoramic image scan, a building plan and/or an image of at least a part of the environment of the network.

12. A network comprising:

a plurality of network devices adapted to perform a radiofrequency sensing, wherein the network devices are adapted to perform different radiofrequency sensing modes, and a system according to claim 1.

13. A method for controlling a radiofrequency sensing of a network, the network having a plurality of network devices, the network being adapted to perform different radiofrequency sensing modes, the method comprising:

providing environmental information, the environmental information being indicative of a physical property of one or more surfaces in an environment of the network, the physical property being indicative of a material and/or a texture of the one or more surfaces;

selecting and/or modifying at least one of the radiofrequency sensing modes to be performed as radiofrequency sensing by at least a part of the network, the at least one radiofrequency sensing mode being selected and/or modified based on the environmental information;

when the environmental information indicates at least one possible radiofrequency signal propagation path between network devices of the at least a part of the network that contains a shallow reflection on a horizontal plane, selecting as the at least one radiofrequency sensing mode an RSSI-based sensing mode at least for the part of the network, the shallow reflection having a reflection that does not allow the reflected radiofrequency signal to be detected by the network device having sent the radiofrequency signal, and controlling the at least a part of the network to perform the at least one selected and/or modified radiofrequency sensing mode.

14. A non-transitory computer readable medium comprising computer program code to perform the method of claim 13 when the computer program code is run on one or more processors.

\* \* \* \* \*